US 6,682,355 B1

(12) United States Patent
Gretz (10) Patent No.: US 6,682,355 B1
(45) Date of Patent: Jan. 27, 2004

(54) ELECTRICAL FITTING FOR EASY SNAP ENGAGEMENT OF CABLES (75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 10/348,111

(22) Filed: Jan. 21, 2003

Related U.S. Application Data (63) Continuation-in-part of application No. 10/286,228, filed on Nov. 1, 2002, which is a continuation-in-part of application No. 10/256,641, filed on Sep. 27, 2002, which is a continuation-in-part of application No. 10/053,076, filed on Jan. 17, 2002, and a continuation-in-part of application No. 09/792,184, filed on Feb. 23, 2001, now Pat. No. 6,604,400, which is a continuation-in-part of application No. 09/603,756, filed on Jun. 26, 2000, now Pat. No. 6,335,488, which is a continuation of application No. 09/165,530, filed on Oct. 2, 1998, now Pat. No. 6,080,933, which is a continuation-in-part of application No. 09/007,532, filed on Jan. 15, 1998, now Pat. No. 6,043,432.

(51) Int. Cl.$^7$ ................................................ H01R 4/66
(52) U.S. Cl. .......................................... 439/98; 174/65 R
(58) Field of Search ........................... 439/92, 95, 98; 174/65 R, 51

(56) References Cited

U.S. PATENT DOCUMENTS

| 2,160,353 | A | | 5/1939 | Conners | |
|---|---|---|---|---|---|
| 3,814,467 | A | * | 6/1974 | Van Buren, Jr. | 285/92 |
| 4,012,578 | A | * | 3/1977 | Moran et al. | 174/51 |
| 4,324,503 | A | * | 4/1982 | Sevrence | 403/197 |
| 4,739,126 | A | * | 4/1988 | Gutter et al. | 174/65 SS |
| 4,773,280 | A | * | 9/1988 | Baumgarten | 403/197 |
| 4,836,580 | A | * | 6/1989 | Farrell | 285/24 |
| 5,072,072 | A | * | 12/1991 | Bawa et al. | 174/65 SS |
| 5,171,164 | A | | 12/1992 | O'Neil et al. | |
| 5,422,437 | A | | 6/1995 | Schnell | |
| 5,648,639 | A | * | 7/1997 | Hand | 174/51 |
| 5,691,505 | A | * | 11/1997 | Norris | 174/51 |
| 5,912,431 | A | * | 6/1999 | Sheehan | 174/65 R |
| 6,034,325 | A | | 3/2000 | Nattel et al. | |
| 6,080,933 | A | * | 6/2000 | Gretz | 174/65 R |
| 6,114,630 | A | * | 9/2000 | Gretz | 174/65 R |
| 6,133,529 | A | * | 10/2000 | Gretz | 174/65 R |
| 6,194,661 | B1 | * | 2/2001 | Gretz | 174/65 R |

* cited by examiner

Primary Examiner—Tho D. Ta
Assistant Examiner—Larisa Tsukerman (57) ABSTRACT

An electrical fitting that enables easy snap-in engagement of armored cable to an electrical panel. The fitting comprises a hollow, tubular, electrically conductive housing including a fastening arrangement on the leading end to allow snap-in engagement to a panel. A resilient, electrically conductive, generally cylindrical-shaped split ring is secured within the trailing end of the housing and includes a plurality of locking tangs lanced longitudinally and bent inwardly to a smaller diameter than the outer diameter of the armored cable that the fitting will be used in conjunction with. Edges of the locking tangs are staggered longitudinally within the tubular connector to enable each tang to engage a trough in the surface of the armored cable. The tight engagement of the locking tangs to the trough areas of the cable provide good surface contact between the locking tangs and the cable, thereby improving continuity and lowering the millivolt drop between the cable, the fitting, and the panel.

13 Claims, 5 Drawing Sheets

ELECTRICAL FITTING FOR EASY SNAP ENGAGEMENT OF CABLES

This application is a Continuation-In-Part of U.S. patent application Ser. No. 10/286,228 entitled "Snap Engagement Electrical Fitting for EMT", filed Nov. 1, 2002 and still pending, which is a Continuation-In-Part of U.S. patent application Ser. No. 10/256,641 entitled "High Continuity Electrical Fitting", filed Sep. 27, 2002 and still pending which is a Continuation-In-Part of U.S. patent application Ser. No. 10/053,076 entitled "Snap Tight Fitting with Improved Continuity", filed Jan. 17, 2002 and still pending and is a Continuation-In-Part of U.S. patent application Ser. No. 09/792,184 entitled "Electrical Connector", filed Feb. 23, 2001, U.S. Pat. No. 6,604,400 which is a Continuation-In-Part of U.S. patent application Ser. No. 09/603,756, filed Jun. 26, 2000 now U.S. Pat. No. 6,335,488, which is a Continuation of U.S. patent application Ser. No. 09/165,530, filed Oct. 2, 1998, now U.S. Pat. No. 6,080,933, which is a Continuation-In-Part of U.S. patent application Ser. No. 09/007,532, filed Jan. 15, 1998, now U.S. Pat. No. 6,043,432.

FIELD OF THE INVENTION

This invention relates to fittings for connecting electrical cables and flexible conduit to a panel and specifically to an improved fitting that allows easier insertion of the cable or conduit into the trailing end of the fitting.

BACKGROUND OF THE INVENTION

Historically, armored cable (AC) or metal-clad cable (MC) has been connected to a panel by a tubular fitting including a leading end having a threaded nose and a trailing end having a lateral screw mounted laterally through the fitting wall. The threaded nose was inserted into an aperture in the panel and a locknut tightened thereon to secure the fitting to the panel. AC or MC cable was then inserted into the trailing end and the lateral screw tightened to secure the cable to the fitting. Since the fitting, the panel, the locknut, the lateral screw, and the jacket of the cable were typically constructed of metal, securing the cable to the panel in the aforementioned manner would create good electrical continuity or ground between the cable and the panel.

To reduce the time and effort required to connect AC or MC cables to panels, the present inventor has introduced several snap-engagement type fittings. Early examples of a snap-in connector were disclosed in U.S. Pat. No. 6,043,432, filed Jan. 15, 1998 and U.S. Pat. No. 6,080,933, filed Oct. 2, 1998 and both incorporated herein by reference in their entirety. These patents disclosed a snap fitting that included a spring steel locking ring to receive an armored cable and lock it into the trailing end of the connector. The spring steel locking ring included outward directed tangs allowing uni-directional insertion into the connector and inward directed tangs to permit reception of the armored cable into the trailing end and restrict its withdrawal from the connector.

U.S. Pat. No. 6,335,488 filed Jun. 26, 2000 and incorporated herein by reference in its entirety, improved upon the snap engagement fitting by increasing the number of inward directed tangs from two to three and varying the spacing of the inward directed tangs to increase cable engagement and thus better prevent its removal by a rearward withdrawal motion.

A further improvement to the snap engagement fitting was disclosed in U.S. patent application Ser. No. 09/792,184 entitled "Electrical Connector", filed Feb. 23, 2001 and incorporated herein by reference in its entirety. Ser. No. 09/792,184 provided a snap engagement fitting with an additional aperture in the cylindrical housing in the trailing end for facilitating removal of the trailing end snap-in spring steel retainer. It also included an alternative internal flange system on the trailing end for improving the retention of the spring steel adapter.

U.S. patent application Ser. No. 10/053,076, filed Jan. 17, 2002 and incorporated herein by reference in its entirety, further improved the snap engagement fitting by improving the continuity between the fitting, the cable, and the junction box. The disclosure provided a snap ring in the trailing end that included at least one grounding tang cantilevered from its outer circumference. The grounding tangs, located near the trailing end of the spring member, extend at a rising slope from their supported end to a crest and then at a downward slope to its trailing end. When pressed into a hole in a junction box, the grounding tangs are compressed toward the fitting until the crest clears the hole whereupon the springiness of the grounding tangs and the downward slope cause the fitting to be drawn tightly against the junction box wall, thereby improving continuity of the fitting.

U.S. patent application Ser. No. 10/256,641, filed Sep. 27, 2002 and incorporated herein by reference in its entirety, further increased the continuity of the snap engagement fitting by providing locking tangs integral with the grounding tangs thereby making a greater portion of the periphery of the snap ring is available for forming the grounding tang. The grounding tangs could therefore be made larger and thereby improving continuity and lowering the millivolt drop between the grounding tangs and the junction box. Electrical continuity was further enhanced by the design of the grounding tangs, which extend from the snap ring at a rising slope to a crest and then at a downward slope to their free ends thereby enabling the downward slope portion of the grounding tangs to pull against the surrounding walls of the junction box and draw the fitting tight against the side of the box.

U.S. patent application Ser. No. 10/286,228, filed Nov. 1, 2002 and incorporated herein by reference in its entirety, provided a snap-in engagement fitting for securing electrical metallic tubing (EMT) to a panel. The fitting provided a split ring on its trailing end that included a plurality of locking tangs lanced longitudinally and bent inwardly to a smaller diameter than the outer diameter of EMT that it was used in conjunction with. Arcuate edges were provided on the leading ends of the locking tangs to dig into the outer surface of the EMT and thereby secured it to the trailing end of connector. The large contact area between the locking tangs and the EMT improved continuity and lowered the millivolt drop.

Although several improvements have been made to the original design of the snap engagement electrical fitting, as a result of the limited space available for flexing of the locking tangs, the fitting has at times proved less than ideal for engaging oversized AC or MC cable. Typically the tubular connector of the snap engagement fitting is secured to a panel in close proximity to adjacent connectors. The outer dimension of the connector must therefore be limited in size. As a result of limiting the size of the connector, past snap engagement fittings for AC or MC cable have limited the outward travel of the cable locking tangs and made it difficult to insert oversized cable. What is needed therefore is a snap engagement fitting that allows unimpeded outward flexing of the cable locking tangs while also allowing mounting of several fittings in a panel in close proximity to one another.

OBJECT OF THE INVENTION

The purpose of the present invention is the improvement of the fitting for snap engagement of armored cable to a panel. Specifically, the fitting has been modified to allow unimpeded outward flexing of the cable locking tangs while at the same time allowing insertion of multiple fittings into a panel in close proximity to one another.

These and other advantages will become apparent by reading the attached specification and claims in conjunction with reference to the attached drawings.

SUMMARY OF THE INVENTION

The present invention comprises a fitting that provides a trailing end designed for easy snap-in engagement of armored cable of the type that includes a convoluted surface having trough areas and crown areas. The fitting comprises a hollow, tubular, electrically conductive electrical connector having a leading for connecting to a panel and a trailing end for accepting armored cable. A fastening arrangement is provided on the leading end to allow snap-in engagement to a panel. A resilient, electrically conductive, generally cylindrical-shaped split snap ring is secured within the trailing end of the connector. The split snap ring may be described as having a longitudinal axis there through the axial center of the ring. A plurality of locking tangs are lanced longitudinally and bent inwardly to a smaller diameter than the outer diameter of armored cable that the fitting will be used in conjunction with. Edges of the locking tangs are staggered longitudinally within the tubular connector to enable each tang to engage a trough in the surface of the armored cable and thereby hold it fast to the trailing end of connector. The fastening arrangement on the leading end of the fitting is typically a split ring affixed to the nose of the connector. The connector, split ring affixed to the nose of the connector, and the split ring secured within the trailing end of the connector comprise the fitting of the present invention that provides snap-in engagement on both ends of the fitting. The fitting allows the leading end of the connector to be snapped into a standard sized aperture in a panel and also allows armored cable to be snapped into its trailing end. The tight engagement of the locking tangs to the trough areas of the cable provide good surface contact between the locking tangs and the cable, thereby improving continuity and lowering the millivolt drop between the cable, the fitting, and the panel.

| Index to Reference Numerals in Drawings | |
|---|---|
| 20 | fitting |
| 22 | tubular housing |
| 24 | leading end |
| 26 | trailing end |
| 28 | central bore |
| 30 | aperture in junction box |
| 32 | junction box |
| 34 | split snap ring |
| 36 | armored cable |
| 38 | fastening arrangement |
| 40 | arrangement at trailing end |
| 41 | outward-directed tang |
| 42 | slot |
| 44 | central axis of housing |
| 46 | axial center of aperture |
| 48 | seat |
| 50 | nose portion |
| 52 | end flange |
| 54 | tubular wall |
| 56 | viewing window |
| 58 | recesses |
| 60 | inner periphery of tubular wall |
| 62 | blank |
| 64 | leading edge of split snap ring |
| 66 | trailing edge of split snap ring |
| 68 | U-shaped slots |
| 70 | slots |
| 72 | cuts |
| 74 | locking tang |
| 74A | locking tang |
| 74B | locking tang |
| 74C | locking tang |
| 76 | tab end of blank |
| 78 | slot end of blank |
| 80 | cantilevered end of locking tang |
| 82 | generally cylindrical wall of split snap ring |
| 84 | free end of locking tang |
| 86 | axial center of split snap ring |
| 88 | sharp edge |
| 90 | crown |
| 92 | trough |
| 94 | forward split ring |
| 96 | forward tang |
| 98 | grounding tang |
| 100 | wall of junction box |

DETAILED DESCRIPTION OF THE INVENTION

The present invention comprises a fitting for securing armored cable to a panel or junction box. The fitting provides snap-fit engagement of the leading end of the fitting to a panel and snap-fit engagement of armored cable to the trailing end of the fitting.

Armored cable typically consists of a metal sheath surrounding one or more individually wrapped conductors. The metal sheath typically includes a surface with a repeating helical pattern throughout its length. The metal sheath is typically comprised of a helically interlocked continuous strip of metal or smooth or corrugated continuous metal tubing.

The National Electrical Code specifies two basic types of armored cable, including Type AC (Armored Cable) and Type MC (Metal Clad Cable). There are other variants in the industry, such as HCF (Health Care Facilities) cable, which is a specific design of armored cable, which, as the name implies, is used in specific applications.

Type AC cable includes conductors individually wrapped with paper and a bare ground wire that extends the length of, and contacts, the metal sheath. Type MC cable includes bare conductors that are wrapped as a group with paper or plastic and an insulated ground wire that does not contact the sheath. When installing AC or MC cable, it is important to maintain an uninterrupted conductive path along the metal sheath from one end of the cable to the other. Thus, when securing AC or MC cable to a panel with an electrical fitting, it is important that the fitting hold the cable securely to the panel and that a conductive path is established by the fitting between the outer metallic sheath of the cable and the panel. The fitting of the present invention enables a secure connection, establishes a conductive path, and furthermore enables snap engagement of the fitting to the panel and snap engagement of the armored cable to the fitting.

Figure 1:
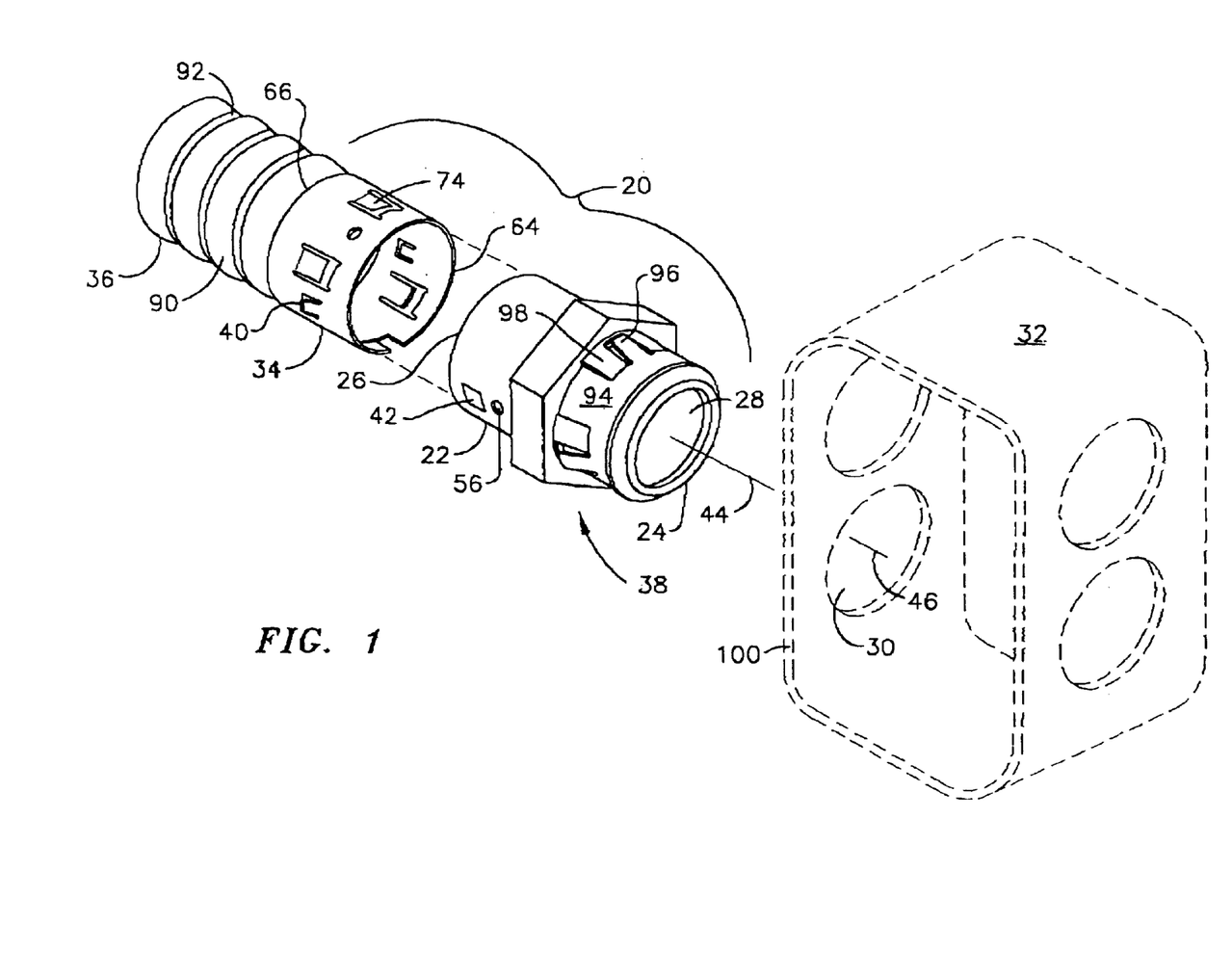
FIG. 1 is a perspective view of a preferred embodiment of the snap engagement electrical fitting according to the present invention in alignment with an electrical box and with the split snap ring exploded away from the housing.

Therefore, with reference to FIG. 1 there is shown a depiction of a fitting 20 including a tubular housing 22 having a leading end 24, a trailing end 26, and a central bore 28 there through. The leading end 24 faces and will be connected to an aperture 30 in a panel or junction box 32. The trailing end 26 faces away from the box 32 and will accept a split snap ring 34 within its central bore 28 that in turn will cooperate with the housing 22 to secure an armored cable 36 therein. The leading end 24 includes a fastening arrangement 38 that cooperates with the housing 22 to secure the fitting 20 to the box 32. Once inserted therein, the split snap ring 34 is held within the central bore 28 of the housing 22 by an arrangement 40 at the trailing end that includes outward-directed tangs 41 that snap into slots 42 in the trailing end 26 of the housing 22. The central bore 28 of the housing 22 is depicted with a central axis 44 which will align with the axial center 46 of the aperture 30 for insertion therein.

Figure 2:
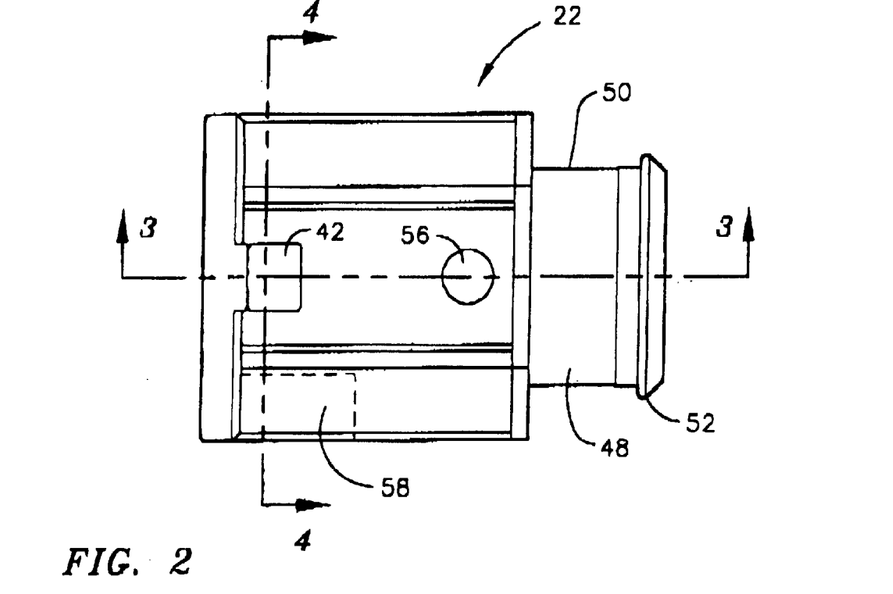
FIG. 2 is a side view of the housing portion of the fitting of FIG. 1.
Figure 3:
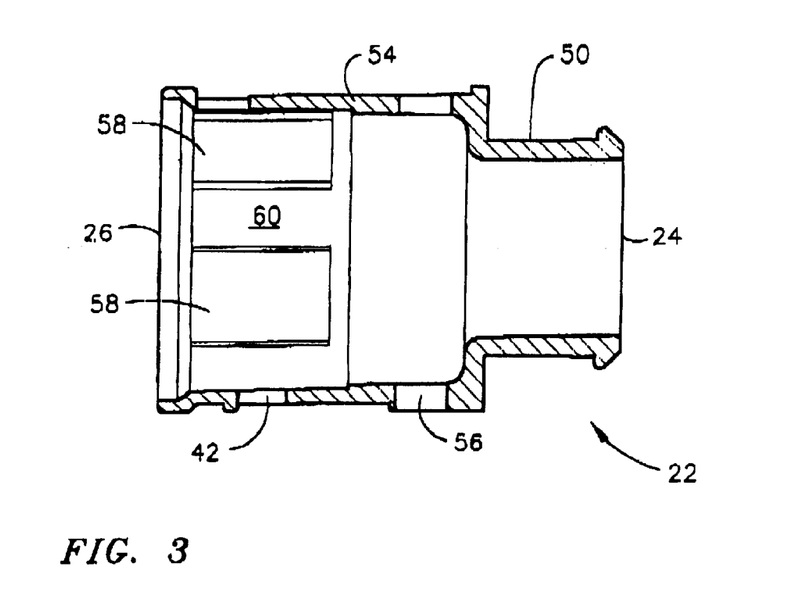
FIG. 3 is a sectional view of the housing taken along line 3—3 of FIG. 2.

Referring to FIGS. 2 and 3, the tubular housing 22 includes on its leading end 24 a seat 48 formed by a necked-down nose portion 50 and an end flange 52. Slots 42 extend through the tubular wall 54 of the housing 22 near the trailing end 26 and a viewing window 56 is provided adjacent the nose portion 50. One or more recesses 58 are provided in the tubular wall 54 that extend the effective outer diameter of the housing 22 to a wider diameter than the main portion of the trailing end 26.

Figure 4:
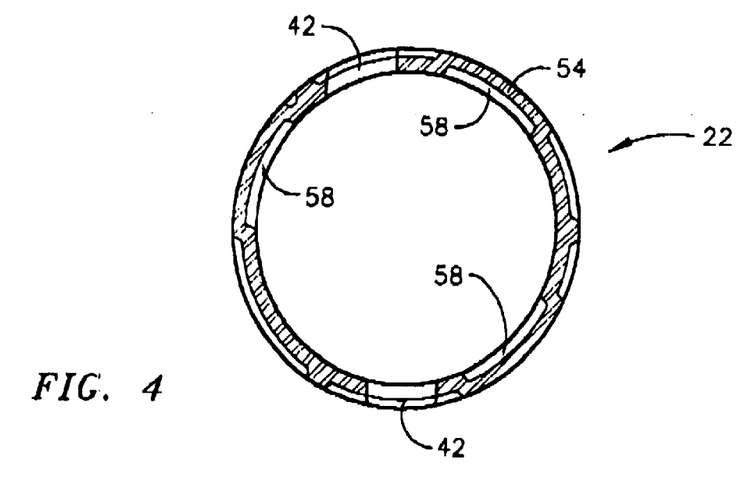
FIG. 4 is a sectional view of the housing taken along line 4—4 of FIG. 2.

With reference to FIG. 4, a preferred embodiment of the housing 22 depicts a total of three recesses 58 formed around the inner periphery 60 of the tubular wall 54. The tubular wall 54 is completely removed in two locations to provide slots 42 as shown.

Figure 5:
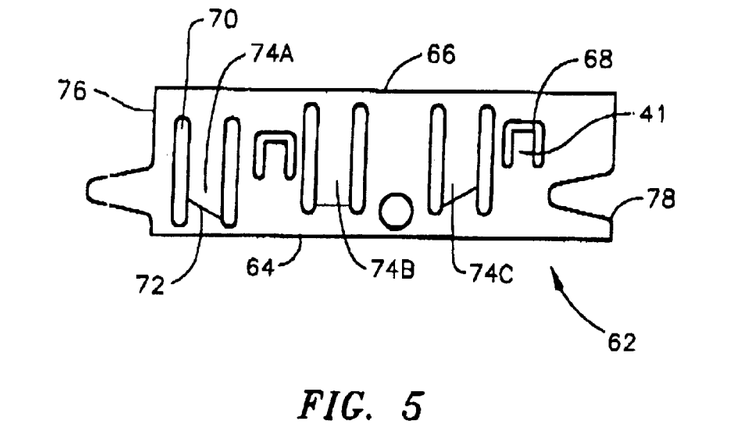
FIG. 5 is a plan view of a blank that will form the generally cylindrical-shaped trailing snap ring of FIG. 1.

Referring to FIG. 5, the split snap ring is formed from a blank 62 that is typically constructed of a resilient material such as spring steel. The blank 62 will be referred to by the orientation it will have after being formed into the generally cylindrical-shaped split ring shown in FIGS. 6 and 7 and inserted into the housing of the fitting (not shown). Therefore, the blank 62 in FIG. 5 includes a leading edge 64 and a trailing edge 66 as shown. U-shaped slots 68 define the outward-directed tangs 41. Slots 70 are arranged in pairs with cuts 72 there between to define locking tangs 74. Although the split snap ring may be constructed with as few as one outward-directed tang and one locking tang, the preferred embodiment of the split snap ring depicted in FIG. 5 includes two outward-directed tangs 41 and three locking tangs 74. The blank 62 includes a tab end 76 and a slot end 78 as shown.

Figure 6:
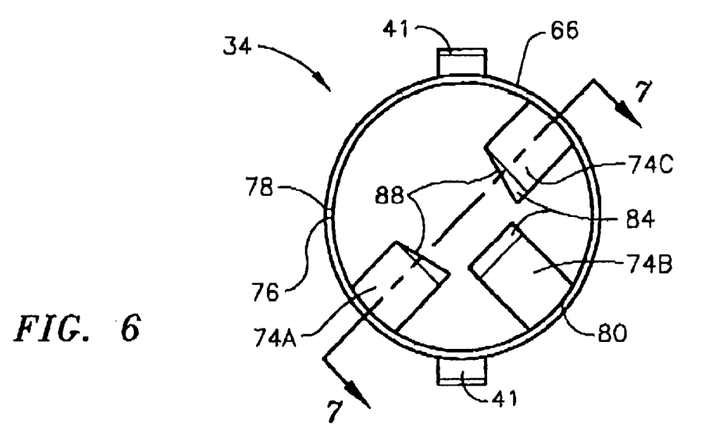
FIG. 6 is an end view of the split snap ring after being formed into its generally cylindrical shape.
Figure 7:
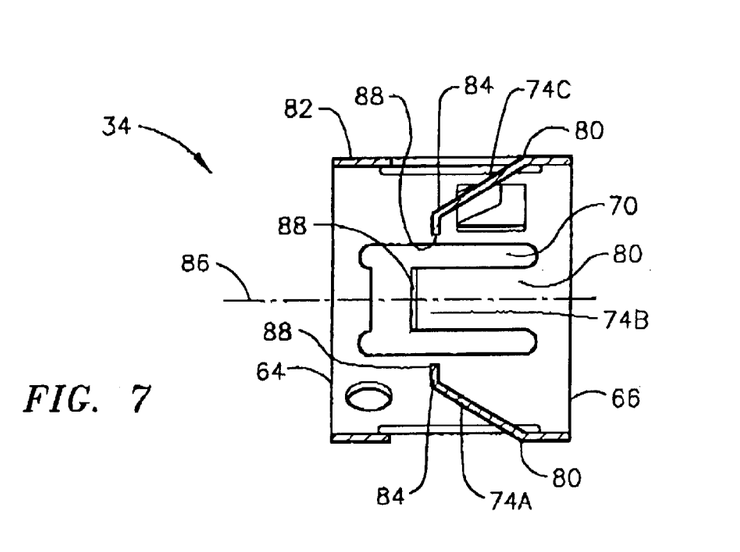
FIG. 7 is a sectional view of the split snap ring taken along line 7—7 of FIG. 6.

The split snap ring 34 is then formed into its generally cylindrical shape as shown in the end view of FIG. 6 and the sectional view of FIG. 7. As shown in FIG. 6, the outward-directed tangs 41 are bent outwards of the generally cylindrical split ring 34 and the locking tangs 74 are bent inwards of the ring 34. The split snap ring 34 is shaped into a generally cylindrical shape, but not completely into a cylinder, therefore, in an unbiased or at rest state, the tab end 76 and the slot end 78 of the ring do not meet. The split snap ring 34 is formed into a generally cylindrical shape with the outer diameter somewhat larger than the inner periphery of the housing at the trailing end (not shown). Sized thus, the split snap ring 34 may easily be compressed with light hand pressure and then inserted into the central bore of the housing at the trailing end (not shown). The three locking tangs 74 may be referred to by separate reference numerals 74A, 74B, and 74C as shown.

Referring to FIG. 7, the cross-sectional view of the split snap ring 34 through line 7—7 of FIG. 6 shows that each locking tang 74A, 74B, and 74C includes a cantilevered end 80 that is integral with the generally cylindrical wall 82 of the ring 34 and a free end 84 that extends towards the axial center 86 of the ring 34. The axial center 86 may also be termed the longitudinal axis of the ring 34. The free end 84 of each locking tang 74 is bent inwards to provide a sharp edge 88 that is further oriented toward the axial center 86. The locking tangs 74 extend from the inner periphery 60 of the tubular wall of the housing 22 at a first angle of preferably between 10° and 30° with respect to the wall 54 and with the end portion 84 at a greater angle of preferably between 50° and 70° with respect to the wall 54.

Referring to FIGS. 5 and 7, the locking tangs 74 are staggered at different distances from the trailing edge 66 of the blank 62. The distance of each tang 74 from the trailing edge 66 is set to enable the sharp inward-turned edge 88 of each locking tang 74 to fall into a trough (not shown) area of an inserted armored cable.

Figure 8:
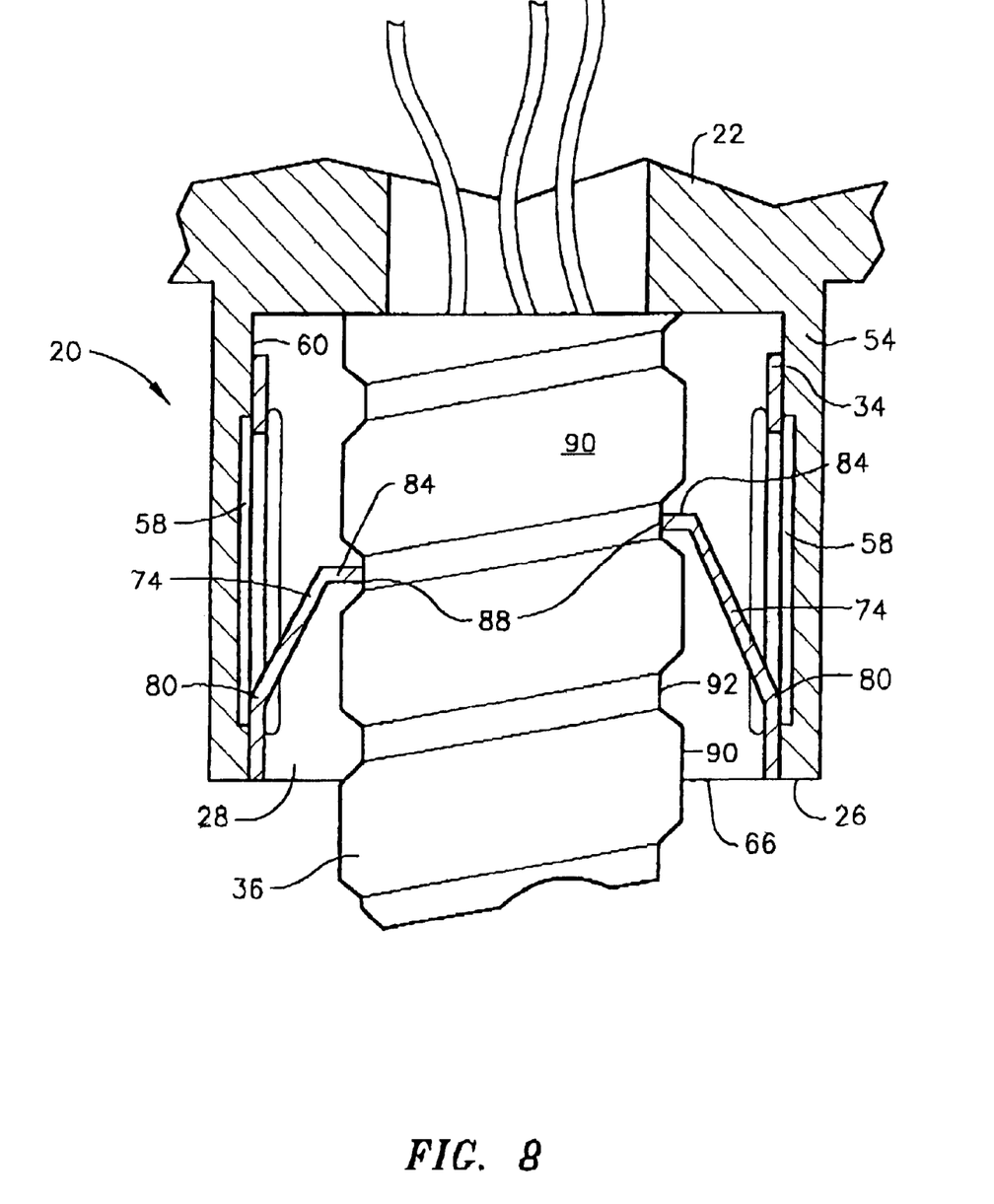
FIG. 8 is a sectional view of a portion of the preferred embodiment of the fitting of the present invention split through two recesses that align with locking tangs and showing an armored cable inserted and held therein.

Referring to FIG. 8, the trailing end 26 of the tubular housing 22 is depicted with a split snap ring 34 secured therein and an armored cable 36 that has been inserted into the trailing end 26. The armored cable 36 includes an outer metal sheath that has been formed from a strip of metal that has been helically wound and interlocked to produce a contour that includes crowns 90 and troughs 92. The split snap ring 34 has been secured within the central bore 28 at the trailing end 26 of the tubular housing 22 by the arrangement at the trailing end (not shown). Once compressed and inserted in the housing 22 as depicted in FIG. 8, the split snap ring 34, being constructed of spring steel and having an at rest or unbiased diameter greater than the inside diameter of the trailing end 26 of the housing 22, springs outward and is held securely within the trailing end 26. The locking tangs 74, being integral with the split snap ring 34 and bent to a smaller dimension than the outer diameter of the trough 92 portion of the armored cable 36, snap within the trough 92 portion of the armored cable 36 and hold it tightly within the housing 22. The locking tangs 74 are at staggered distances from the trailing edge 66 of the split snap ring 34 thereby allowing each locking tang 74 to fall into the trough 92 of the armored cable 36. With the armored cable 36 inserted as shown in FIG. 8, the electrical fitting 20 is highly resistive to subsequent withdrawal of the armored cable 36 by a rearward force applied to the cable 36. This is a result of the stiffness and strength of the split snap ring 34, the strength of the arrangement 40 at the trailing end in holding the ring 34 fast within the housing 22, and the design and location of the locking tangs 74 which each snap into a trough 92 on the cable 36 and apply a force that locks the cable 36 within the housing 22. As compared to previous versions of the snap engagement electrical fitting disclosed by the present inventor, the fitting of the present invention improves upon the insertion of the split snap ring 34 into the housing 22 by providing recesses 58 adjacent each locking tang 74. In previous versions of the snap engagement electrical fitting, the inner periphery 60 of the central bore 28 was a smooth cylinder of a set dimension. Inserting a large diameter armored cable 36 into the trailing end 26 of the housing 22 would push the locking tangs 74 outward until they contacted the inner periphery 60 of the central bore 28. Insertion of a large diameter cable would require a more than desired amount of force. The fitting 20 of the present invention, by including recesses 58 in the inner periphery 60 of the tubular wall 54 in alignment with the locking tangs 74 of the split snap ring 34, allows the locking tangs 74 to travel outwardly without impedance caused by the tubular wall 54, and therefore vastly improves the ease of insertion of the split snap ring 34 into the housing 22 of the fitting 20.

Referring to FIG. 1, the fitting 20 of the present invention therefore enables easy connection of an armored cable 36 to a junction box 32 or panel. The nose portion of the housing 22 typically includes a fastening arrangement 38, which typically includes a forward split ring 94, which is held thereon by the end flange 52. The forward ring 94 typically includes forward tangs 96 for locking the fitting 20 to the box 32 and grounding tangs 98 to urge the fitting 20 against the box 32 and establish higher continuity between the armored cable 36, leading end 24 of the fitting 20, and junction box 32.

With reference to FIG. 8, high continuity is also established on the trailing end 26 of the fitting between the fitting 20 and the cable 36 by the intimate contact of the locking tangs 74 bearing against the inserted cable 36, and the split snap ring 34 with its intimate contact around nearly its entire outer periphery with the inner periphery 60 of the tubular wall 54.

The housing 22 is typically a die-cast member constructed preferably of a conductive metal such as steel, zinc, galvanized steel, or aluminum. A most preferred material of construction for the housing is Zamak #7, a casting alloy comprised mainly of zinc alloyed with aluminum, magnesium, and copper and available from Allied Metal Company, Chicago, Ill. By constructing the housing of Zamak or other appropriate metals, the housing will be electrically conductive and provide good continuity throughout the fitting.

The fitting 20 of the present invention is typically supplied with the forward split ring 94 disposed on the nose portion 50 as shown in FIG. 1, and the split snap ring 34 disposed within the trailing end 26 of the tubular housing 22 (shown exploded away in FIG. 1 for illustration purposes). With the fitting 20 assembled in this manner, use of the fitting to install an armored cable 36 to a box 32 or panel is very simple, and consists of aligning the fitting 20 with the aperture 30 in the box 32, pushing the leading end 24 of the fitting 20 into the aperture 30 until the forward tangs 96 on the forward split ring 94 clear the wall 100 of the box 32 thereby snapping outwards to their unbiased position, and then pushing the end of an armored cable 36 into the central bore at the trailing end 26 of the fitting. The present fitting thereby provides a very simple and easy means of attaching armored cable to a panel while at the same time establishing high continuity and a low millivolt drop between the cable and the panel.

Referring to FIG. 1, one or more viewing windows 56 may be provided in the trailing end 26 of the tubular housing 22 to allow an installer to view the extent of the forward travel of the armored cable 36 into the housing. This provides a convenient means for the installer to insure that the cable is properly inserted into the housing to the full extent desired.

The material of construction of the split snap ring 34 is typically hardened spring steel. A preferred material of construction is AISI (American Iron and Steel Institute) 1050 CRS (cold rolled steel), annealed #3 edge, hardened to Rc 42–44, zinc plated to 0.0005" thick minimum. With a Rockwell C hardness of 42–44, the sharp edges 88 of the locking tangs 74 easily grasp the outer surface of the armored cable 36 that is typically manufactured to the standards of the National Electrical Code. A preferable thickness for the split ring 24 is between 0.010 and 0.030 inch.

Displacement of the locking tangs as described herein and the intimate contact of the sharp edges of the locking tangs on the inserted cable establishes improved continuity an lower millivolt drop between the box and the cable. The locking tangs and sharp edges also serve to lock the conduit within the fitting, thereby providing proper strain relief to the cable and preventing accidental withdrawal of the cable from the fitting and box. Use of the fitting saves a lot of time over traditional prior art fittings, as snap in engagement on both ends of the fitting eliminates the need for manual manipulation of tools to connect the prior art device.

Armored cable (Types AC, MC, or HCF) of course is supplied in a myriad of nominal sizes according to the National Electrical Code. The snap engagement electrical fitting of the present invention can therefore be produced in a myriad of sizes to accommodate the various nominal sizes. Although the relative sizes of the housing and split snap ring will vary with the nominal size of the cable, the principle of providing a tubular housing, a split snap ring on the trailing end, and a fastening arrangement on the leading end remains the same.

Although the description above contains many specifics, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A fitting for securing cable to a panel comprising:
a tubular housing including a leading end, a trailing end, a central bore, and an inner peripheral wall at said trailing end;
a fastening arrangement on said leading end for securing said housing to an aperture in said panel;
a resilient, electrically conductive, generally cylindrical ring inserted within said central bore in said trailing end of said housing, said ring having a trailing edge;
an arrangement at said trailing end of said housing and said ring assembled in a manner to resist removal of said ring from said housing;
a locking tang lanced from said ring which is bent inwardly from said ring and having a free end; and
a recess in said inner peripheral wall of said housing at said trailing end, with said recess in alignment with said locking tang of said ring to provide a space into which said locking tang may be received when forced outward.

2. The fitting of claim 1 wherein said ring includes a total of two or more of said locking tangs.

3. The fitting of claim 2 wherein said free ends of said locking tangs are at staggered distances with respect to said trailing edge.

4. The fitting of claim 1 wherein said split snap ring is formed of spring steel to a thickness of between 0.010 and 0.030 inch.

5. The fitting of claim 4 wherein said spring steel is AISI (American Iron and Steel Institute) 1050 CRS (cold rolled steel), annealed #3 edge, hardened to a Rockwell C hardness of between 42 and 44.

6. The fitting of claim 1 wherein said fastening arrangement includes a seat on said leading end of said housing and an electrically conductive forward split ring disposed on said seat, said forward split ring including tangs for engaging the walls of said panel.

7. The fitting of claim 6 wherein said fastening arrangement includes forward tangs for engaging said panel and grounding tangs for biasing against the walls of said aperture in said panel for providing good electrical continuity between said panel and said housing.

8. The fitting of claim 1 wherein said arrangement at said trailing end includes one or more outward-directed tangs lanced longitudinally from said split snap ring, said outward-directed tangs including a leading end cantilevered from said split ring and a free trailing end; and a complementary number of slots in said trailing end of said housing, whereby compression and insertion of said resilient split snap ring into said trailing end of said housing enables said outward-directed tangs to engage said slots.

9. The fitting of claim 1 wherein said arrangement at said trailing end includes an annular flange at said trailing end of said housing, said annular flange extending into said central bore, said annular flange capturing said resilient split snap ring and securing it therein when said ring is compressed and inserted therein.

10. The fitting of claim 1 wherein said fastening arrangement includes a threaded nose on said leading end of said housing and a threaded lock nut on said threaded nose for engaging the walls of said panel.

11. The fitting of claim 1 wherein said locking tangs extend from said inner peripheral wall of said housing at a first angle of preferably between 10° and 30° with respect to the wall and with the free end at a greater angle of preferably between 50° and 70° with respect to the wall.

12. The fitting of claim 1 wherein said free ends of said locking tangs include sharp edges.

13. A method for quickly connecting armored cable to an aperture in a panel, comprising:

providing an electrically conductive panel with an aperture;

providing an armored cable;

providing a tubular, hollow, electrically conductive housing having a leading end for insertion in said aperture, a trailing end for connection to said armored cable, and a face limiting the distance said leading end may be inserted in said hole;

providing an electrically conductive forward snap ring secured to said leading end of said connector with said forward snap ring having a leading portion and a trailing portion;

providing at least one panel forward tang on said forward snap ring that has a relaxed outer dimension greater than the diameter of said aperture;

providing at least one grounding tang integral with and supported at one end from said forward snap ring and free at its opposite end; and providing a generally cylindrical-shaped electrically conductive split ring secured to said trailing end, said split ring including inward extending locking tangs;

inserting said leading end of said electrical housing with said forward snap ring into said aperture until said crest of said forward tang clears said aperture and said grounding tang draws said face of said electrical connector against said junction box; and inserting said armored cable into said trailing end of said housing containing said split snap ring until each of said locking tangs engage a trough area on the outer surface of said armored cable.

* * * * *